(12) United States Patent
Mills et al.

(10) Patent No.: US 7,280,062 B2
(45) Date of Patent: Oct. 9, 2007

(54) PULSE METERING ARCHITECTURE

(75) Inventors: Michael Mills, Austin, TX (US); Marius Goldenberg, Austin, TX (US); Yan Zhou, Austin, TX (US); Jeffrey Whaley, Dripping Springs, TX (US)

(73) Assignee: Silicon Laboratories Inc., Austin, TX (US)

( * ) Notice: Subject to any disclaimer, the term of this patent is extended or adjusted under 35 U.S.C. 154(b) by 64 days.

(21) Appl. No.: 11/240,206

(22) Filed: Sep. 29, 2005

(65) Prior Publication Data
US 2007/0069934 A1    Mar. 29, 2007

(51) Int. Cl.
*H03M 1/66* (2006.01)
(52) U.S. Cl. ...................... 341/144; 341/145
(58) Field of Classification Search .......... 341/144, 341/145; 379/395.01, 413, 401; 323/311, 323/312
See application file for complete search history.

(56) References Cited

U.S. PATENT DOCUMENTS

| 6,829,353 | B1 | 12/2004 | Enriquez | 379/413 |
| 6,895,040 | B2 | 5/2005 | Zhou | 375/220 |
| 6,934,384 | B1 | 8/2005 | Hein et al. | 379/399.02 |
| 7,167,557 | B2 * | 1/2007 | Youngblood | 379/399.01 |
| 2005/0002517 | A1 | 1/2005 | Hein et al. | 379/398 |
| 2005/0220293 | A1 | 10/2005 | Hein et al. | 379/413 |

FOREIGN PATENT DOCUMENTS

WO   PCT/AT98/00159   * 1/1999

OTHER PUBLICATIONS

U.S. Appl. No. 11/240,272, filed Sep. 29, 2005, entitled "Method and Apparatus for Generating A Metering Pulse" by Michael Mills, Marius Goldenberg, Yan Zhou, Jeffrey Whaley.
Silicon Laboratories, "Si3220/Si3225, Dual ProSLIC Programmable CMOS SLIC/Codec"; Jun. 2004; pp. 1-108.

* cited by examiner

*Primary Examiner*—Brian Young
(74) *Attorney, Agent, or Firm*—Trop, Pruner & Hu, P.C.

(57) ABSTRACT

In one embodiment, a subscriber line interface circuit includes circuitry to generate metering pulses for insertion onto a subscriber line. The circuitry includes a cascaded digital-to-analog converter (DAC) structure including a first DAC to convert a digital sine wave into an analog representation, a second DAC to multiply the analog representation with a ramp value to obtain an unscaled output, and a third DAC to multiply the unscaled output with a gain value to generate a metering pulse.

25 Claims, 11 Drawing Sheets

PULSE METERING ARCHITECTURE

FIELD OF THE INVENTION

The present invention relates to the field of telecommunications, and more particularly to a subscriber line interface circuit (SLIC).

BACKGROUND

Subscriber line interface circuits are typically found in a central office exchange of a telecommunications network. A SLIC provides a communications interface between the digital switching network of the central office and an analog subscriber line. The analog subscriber line connects to a subscriber station or telephone instrument at a location that is remote from the central office exchange.

The analog subscriber line and subscriber equipment (e.g., a telephone) form a subscriber loop. The interface requirements of a SLIC typically cause high voltages and currents for control signaling with respect to the subscriber equipment on the subscriber loop. Voiceband communications are typically low voltage analog signals on the subscriber loop. Accordingly, the SLIC performs various functions with respect to voiceband and control signaling between the subscriber equipment and the central exchange.

Another function a SLIC typically performs is pulse metering. Pulse metering is used to provide a pulse sequence that is indicative of a cost or other billing information of an ongoing communication (e.g., a billing tone). For example, a series of metering pulses can be generated by a SLIC. The number of these pulses can be indicative of a cost of an ongoing communication, and may further be used to disable a communication device, such as a telephone, after a given amount of pulses have occurred (e.g., after phone charges for a call meets the amount paid for the call). Meter pulses are generally generated at a frequency outside of the audio band, typically at 12 kHz or 16 kHz.

Circuitry within a SLIC can be shared to perform both pulse metering and audio transmission. However, the generation of meter pulses can create noise, which can undesirably affect audio quality of a phone call or other communication. Noise can also be an issue at much higher frequencies, such as those at which a digital subscriber line (DSL) modem coupled to a telephone line operates. Specifically, harmonics of noise in meter pulses can cause noise at these higher frequencies, which typically range from 25 kHz to 2,200 kHz.

Another problem with sharing circuitry between an audio path and a pulse metering path is that pulse metering operates on a different impedance model than the audio path. That is, SLICs typically connect to a telephone line. Such telephone lines are made of low quality copper wire. Accordingly, phone lines are typically modeled with a relatively high impedance for audio transmission (e.g., 600 ohms ($\Omega$)). In contrast, the pulse metering path through the phone lines is typically modeled with a much lower impedance (e.g., 200 $\Omega$). Thus pulse metering operates on a lower impedance, R, and thus requires more current, I, to achieve a certain voltage (V=IR). In contrast, audio operates on a higher impedance and thus needs less current. In the example described herein, the audio requires only one third of the current gain because it has a three times larger impedance level.

Another design consideration is that analog oscillators used in generating metering pulses consume significant area. Accordingly, some SLICs use a digital oscillator to form a digitally generated sine wave. However, such a digitally generated sine wave can itself cause undesired noise, specifically, quantization noise. To reduce such noise, digital-to-analog converters (DAC's) having a relatively larger number of bits are used. Thus, DACs used in pulse generation circuitry typically have a high resolution, providing greater dynamic range to reduce the effects of noise. However, such higher resolution DACs are more expensive and consume greater chip real estate.

Because noise is a concern in the audio band, circuitry used to generate both pulse metering signals and audio signals needs to have sufficient resolution to reduce the noise to acceptable levels. That is, the more bits used to represent a sample will reduce the quantization noise, increasing the signal to noise ratio (SNR), improving resolution. However, such circuitry is expensive and consumes significant chip real estate.

Additionally, the problem of using a digital oscillator is compounded by the fact that audio and pulse metering paths work on different impedances and therefore require different gains. To resolve this issue of gain differences, DACs having more bits are used, increasing area. If a single DAC is used for both pulse metering and audio functions, three times the current gain is used, even though it is not needed for the audio portion. Because this gain increases the noise, the DAC must have a sufficiently large resolution to overcome the noise issue.

In other words, noise in a SLIC is constrained by an audio specification which requires low gain. However, the gain is constrained by a pulse metering specification, which requires a large gain value. These constraints often lead to use of expensive high resolution DACs in conventional SLICs.

Accordingly, a need exists to provide pulse metering functions while reducing noise at audio levels and at DSL levels.

SUMMARY OF THE INVENTION

In one aspect, the present invention includes an apparatus having a first digital-to-analog converter (DAC) to convert a digital sine wave into an analog representation and a second DAC to multiply the analog representation with a ramp value to obtain a metering pulse. In some implementations, the apparatus may be adapted as part of a subscriber line interface circuit (SLIC) to couple to a subscriber line. In these implementations, an additional DAC, namely a third DAC, may be included in the apparatus to multiply the metering pulse with a gain value to generate a metering pulse that is scaled to the subscriber line. Each of the DACs may perform orthogonal and exclusive functions and thus each may be optimized for its own particular function. As one example, the first DAC may have a differential non-linearity (DNL) that is sufficient to generate the analog representation, while the second DAC may have a different DNL sufficient to generate the metering pulse from the analog representation.

Another aspect resides in a method for obtaining a periodic wave and generating a metering pulse for a subscriber line from the periodic wave. The metering pulse may include tonal noise outside an audible bandwidth of an audio signal on a subscriber line. In some implementations, the metering pulse may be generated using one or more DACs of lower resolution. Use of cascaded lower resolution DACs may result in an output that is equivalent to that generated by a higher resolution DAC, without the size and expense of such a higher resolution DAC. Further, one or more of the DACs may be controlled to avoid transitions in which DNL cannot be guaranteed. A calibration routine may be performed to calibrate one or more of the DACs to a subscriber line to which they are coupled to improve performance and/or reduce power consumption. In addition, various control schemes may be implemented to reduce noise in an audio band as well as at higher frequencies such as data transmission frequencies on the subscriber line.

In yet other embodiments, a SLIC may include an audio path to transmit audio signals from the SLIC to a subscriber line and a pulse metering path to generate a metering pulse for transmission via the subscriber line. The pulse metering path may include a cascaded DAC to generate the metering pulse. The cascaded DAC may include multiple levels, including a global DAC to generate a sine wave, a ramp DAC to generate an unscaled metering pulse using the sine wave, and a gain DAC to generate the metering pulse using the unscaled metering pulse. There may be multiple channels of ramp and gain DACs, in some embodiments.

DETAILED DESCRIPTION

In various embodiments, a SLIC may include relatively inexpensive DACs to generate meter pulses. Specifically, lower resolution DACs than DACs used for audio processing may be used for purposes of pulse metering. That is, separate pulse metering and audio paths may be provided in a SLIC. Furthermore, the pulse metering path may use different DACs than the audio path.

Such lower resolution DACs may be used in the pulse metering path, as quantization noise does not affect the audio path for several reasons. First, the quantization noise does not affect the audio path because there are two separate paths provided. Furthermore, quantization noise does not affect audio signals because the quantization noise present in a digitally generated sine wave is tonal. That is, because the digitally generated sine wave is substantially coherent (or identical) period-to-period (in other words, is a perfectly periodic signal), the quantization noise does not have subharmonics (or has substantially attenuated subharmonics) and accordingly, any quantization noise is isolated from the audio band.

Figure 1A:
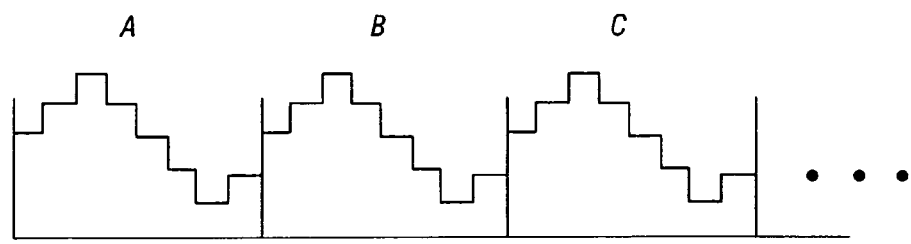
FIG. 1A depicts a waveform for a digitally generated sine wave.

For example, FIG. 1A shows a waveform for a digitally generated sine wave 10. Specifically, FIG. 1A shows three periods A, B, and C of the sine wave. Because the sine wave 10 is digitally generated, quantization noise exists. However, because the sine wave 10 is identical from one period to the next, all of its quantization noise is tonal and exists only at multiples of the fundamental frequency. With respect to pulse metering, this fundamental frequency can be at 12 kHz or 16 kHz.

Figure 1B:
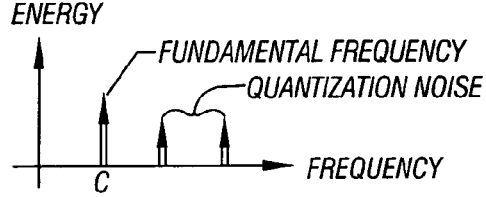
FIG. 1B depicts a measure of energy of the digital sine wave of FIG. 1A in the frequency domain.

FIG. 1B shows a measure of energy of the digital sine wave of FIG. 1A in the frequency domain 20. As shown in FIG. 1B, the amplitude of the sine wave is generated at the fundamental frequency (e.g., 12 or 16 kHz). Because the digital sine wave 10 is coherent period-to-period, quantization noise exists only at multiples of the fundamental frequency, as shown in FIG. 1B. Such quantization noise thus is far removed from the audio band of interest (e.g., approximately 0-4 kHz). As a result, lower resolution DACs can be used for the pulse metering path.

In some embodiments, the DACs may be implemented using resistor-based DACs, such as formed from resistor ladders, rather than transistor-based DACs. Such resistor-based DACs may be used to further reduce the effects of noise. That is, resistors generally only have thermal noise, which is flat. In contrast, transistors have flicker noise that is larger at lower frequencies (i.e., in the audio band).

Figure 2:
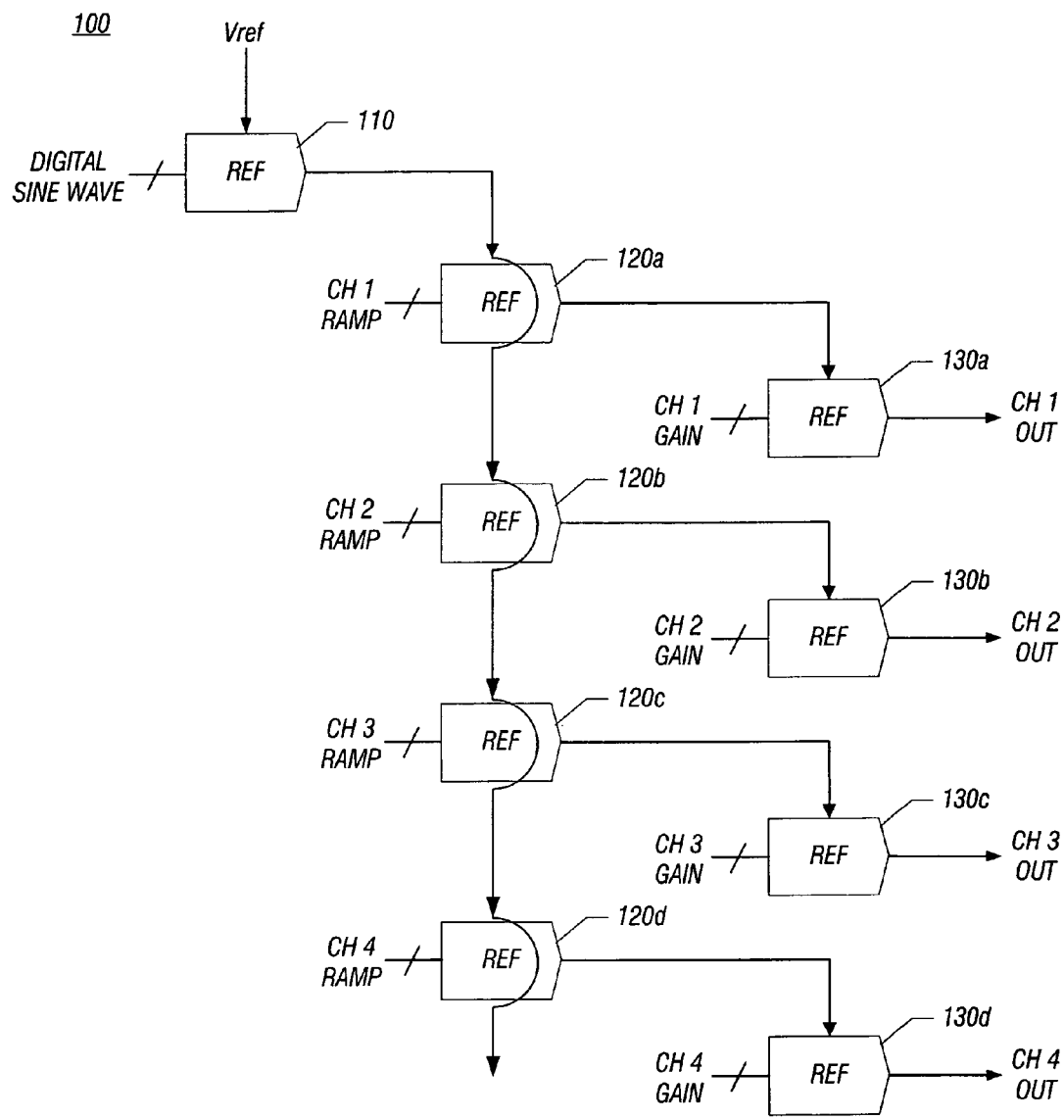
FIG. 2 is a block diagram of a digital-to-analog converter circuit for use in pulse metering circuitry in accordance with one embodiment of the present invention.
Figure 3:
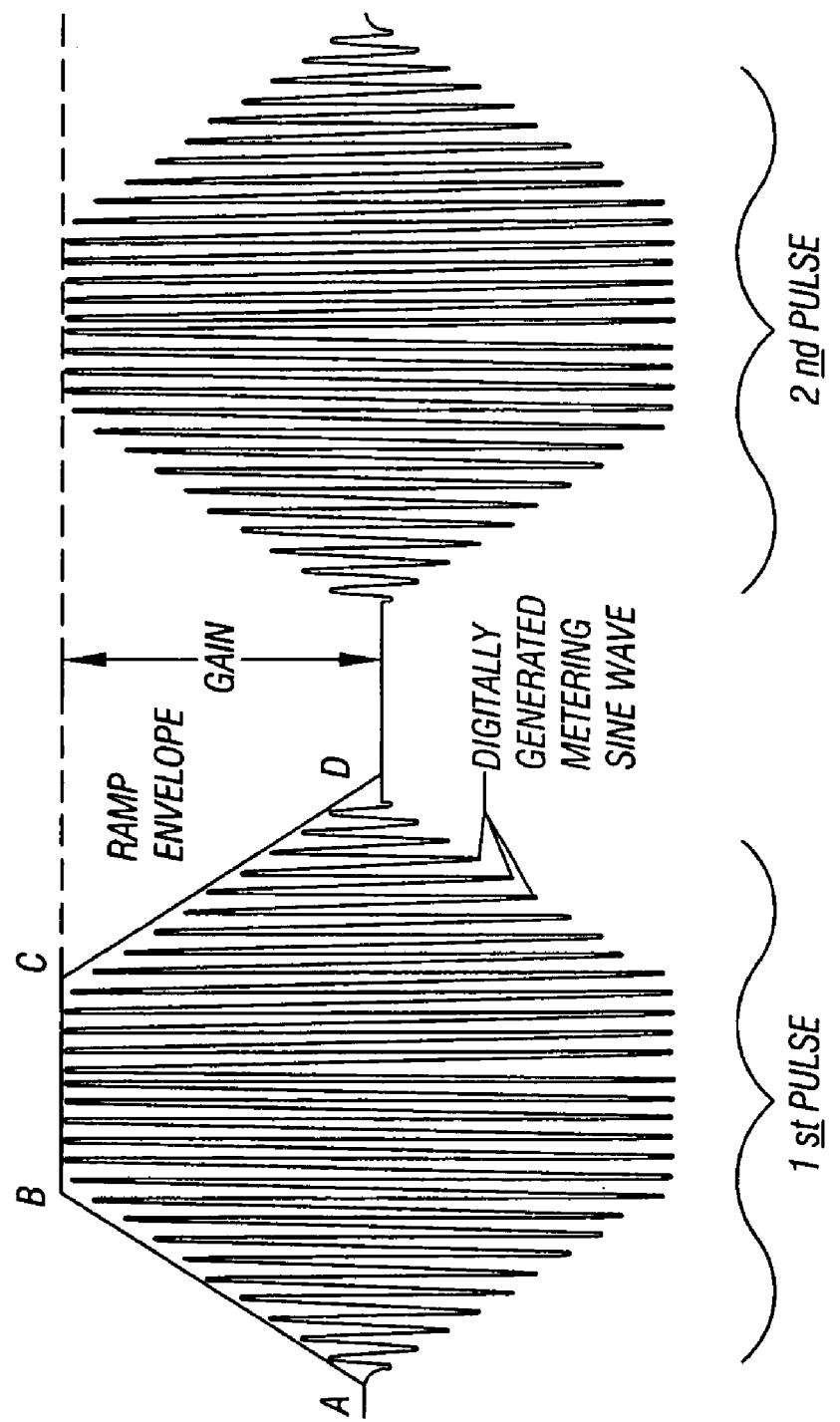
FIG. 3 depicts a first pulse and a second pulse of a metering pulse stream.

Referring now to FIG. 2, shown is a block diagram of a DAC structure for use in a pulse metering path of a SLIC in accordance with one embodiment of the present invention. As shown in FIG. 2, circuitry 100 includes a plurality of DACs cascaded together to generate metering pulses. An example of metering pulses is shown in FIG. 3. As shown in FIG. 3, a first pulse and a second pulse of a metering pulse stream are shown. Each pulse is formed of a number of digitally generated sine waves having increasing and decreasing amplitudes to form a ramp envelope, generally in the form of a hexagonal shape. As shown in FIG. 3, the first pulse begins at point A, at which time the digitally generated sine wave begins ramping up at a selected rate. The pulse ramps up at the selected rate until a maximum value or threshold is reached (at point B). Note that the ramping of the sine wave when digitally generated also causes noise issues.

Still referring to FIG. 3, thereafter, the pulse continues at the maximum level until the pulse is terminated (at point C), which may occur under user-selected control. Accordingly, the pulse declines according to the selected ramp rate until it ends at point D. The pulses have a maximum gain according to the actual impedance, which is set by the impedance of a subscriber line to which a SLIC including circuitry 100 is coupled. While the amplitude of the metering pulses may vary, in some embodiments, the metering pulses may have a maximum amplitude of approximately 2.5 volts (RMS) as seen at the subscriber line interface (i.e., at the tip and ring nodes).

Referring back to FIG. 2, a first DAC 110 receives an incoming digital sine wave that is generated from a digital oscillator. While the scope of the present invention is not so limited, in some embodiments the digital sine wave may be generated at a frequency of 12 kHz or 16 kHz. Note that the hash marks shown on various signals in FIG. 2 indicate that the given signal is a digital signal. First DAC 110 also receives a reference voltage ($V_{ref}$) which may be a DC voltage. The resolution of DAC 110 provides the resolution of the digital sine wave. Accordingly, first DAC 110 may be referred to as a global sine wave DAC. In one embodiment, first DAC 110 may have a resolution of 11 bits, although the scope of the present invention is not so limited. In one embodiment, first DAC 110 may include a first portion formed of a thermometer-encoded structure, and a second portion formed of a binary structure. In this embodiment, 3 bits may be for thermometer control and 8 bits may be for binary control, although other implementations are possible.

The output of first DAC 110 is thus an analog sine wave that is input as a reference voltage to a plurality of second DACs 120a-d (generally DACs 120), which are each associated with a corresponding channel (i.e., channels A-D). Each of second DACs 120 may also receive a ramp value for the corresponding channel (the ramp value for each channel may be independently generated). Accordingly, second DACs 120a-d provide the ramp resolution. Thus, second DACs 120 may be referred to herein as ramp DACs. In one embodiment, second DACs 120 may have a resolution of 9 bits, although the scope of the present invention is not so limited. In one embodiment, second DAC 120 may include a first portion formed of a thermometer-encoded structure, and a second portion formed of a binary structure. In this embodiment, 2 bits may be for thermometer control and 7 bits for binary control, although other implementations are possible. The output of each of second DACs 120a-d is equal to the value of the analog sine wave multiplied by the ramp value for the channel. In other words, the output of second DACs 120a-d is the unscaled metering pulse signal.

This unscaled pulse metering signal is provided as a reference voltage to a selected one of a plurality of third DACs 130a-d (generally third DACs 130). Each third DAC 130a-d also receives a gain value for the given channel. Third DACs 130 may be referred to as gain DACs. The gain value may be set based on the impedance of a specific subscriber line to which circuitry 100 is coupled. In one embodiment, third DACs 130 may have a resolution of 4 bits, although the scope of the present invention is not so limited. In such manner, the output of third DACs 130a-d provides a scaled value of the sine wave multiplied by the ramp setting multiplied by the gain setting.

While shown in the embodiment of FIG. 2 as including a three-level cascaded structure, the scope of the present invention is not so limited. That is, in other embodiments more or fewer such levels may be provided. For example, in some implementations only two cascaded levels may be provided, namely a digital sine wave DAC and a ramp DAC that has sufficient resolution to also accommodate the gain factor. However, a structure with three or more levels may be used in some embodiments to reduce the resolution of the individual DAC structures.

In the embodiment shown in FIG. 2, circuit 100 may generate a metering pulse, MP according to the following equation:

$$MP = DSW \times Ramp\ Value \times Gain\ Setting \qquad [Eq.\ 1]$$

where DSW is the value of the digital sine wave, Ramp Value is the value of the ramp rate, which may be user selected, and Gain Setting is a value used to scale the metering pulse according to a line to which circuitry 100 is coupled. The output of third DACs 130a-d is thus the pulse metering signal scaled to a given subscriber line. Note that the metering pulse generated, MP, is a constantly changing value corresponding to the continually increasing and decreasing sine wave within the ramp envelope shown in FIG. 3. Using the cascaded DAC structure 100 of FIG. 2, a resolution may be achieved (e.g., summing the resolution of the first, second and third DACs). That is, although each individual DAC has a substantially lower individual resolution, reducing size and expense, a higher equivalent resolution is achieved. This feature is due to the fact that the different DAC levels perform orthogonal functions. That is, each function, namely digital sine wave, ramp, and gain are all independent. The resolution of the global sine wave DAC and the ramp DACs may be relatively larger, as the values used to control these DACs change over time. In contrast, the gain value used to control the gain DAC generally does not change, and thus the gain DAC may be controlled to avoid transitions where monotonicity cannot be guaranteed. Accordingly, although each independent DAC has a lower differential non-linearity (DNL), in the embodiment described herein, the control signals provided to DAC structure 100 enable generation of a metering pulse having significantly reduced noise, resulting in a higher equivalent differential nonlinearity than any of the individual DACs. In some implementations, DAC structure 100 may have a resolution substantially equivalent to a 24-bit DAC, although each of the structures are of significantly lesser resolution.

While shown in the embodiment of FIG. 2 as including four channels, the scope of the present invention is not so limited, and more or fewer channels may be present in a given implementation.

Figure 4:
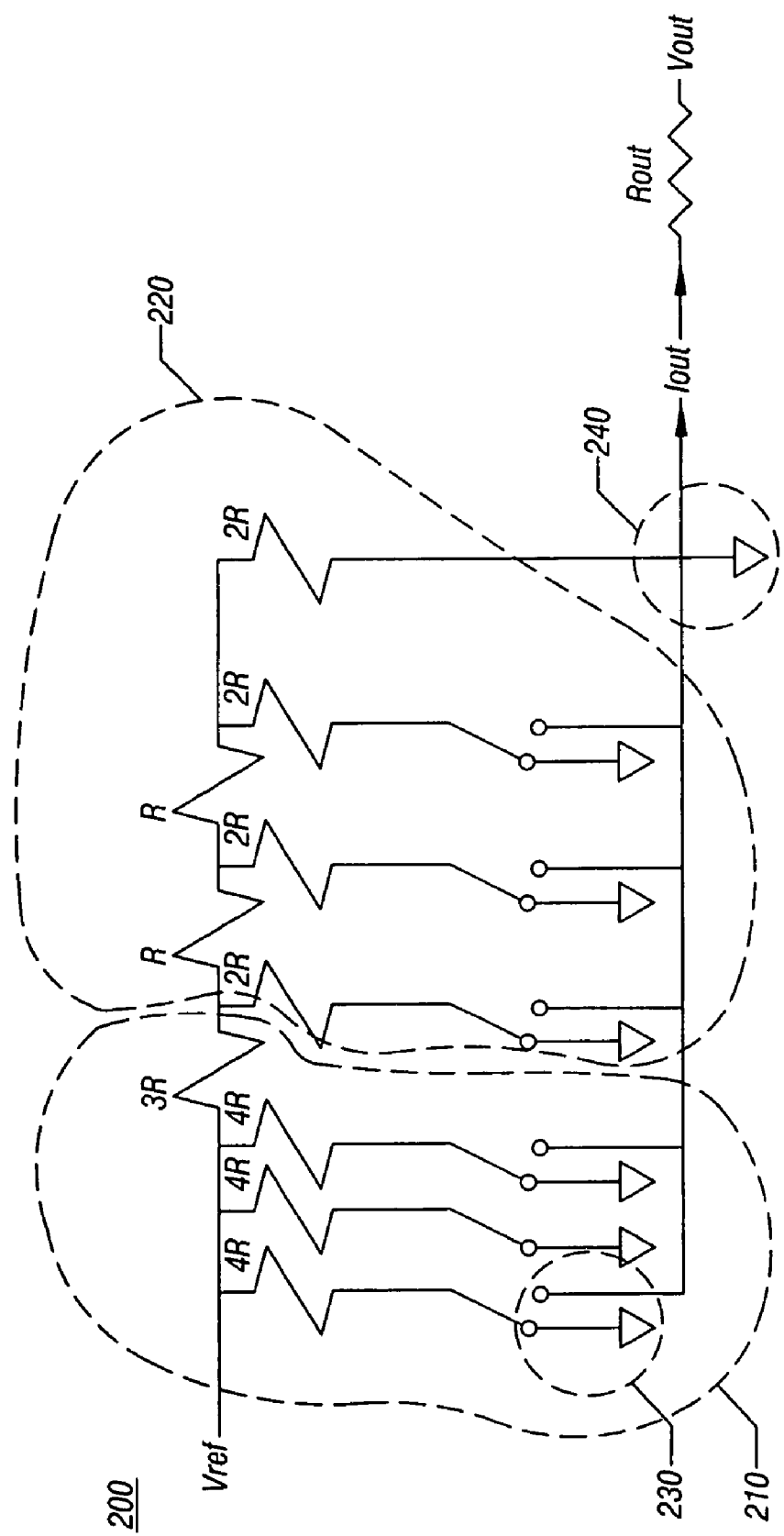
FIG. 4 is a block diagram of a digital-to-analog converter circuit in accordance with an embodiment of the present invention.

Referring now to FIG. 4, shown is a block diagram of a DAC in accordance with one embodiment of the present invention. As shown in FIG. 4, DAC 200 is formed using a resistor ladder. DAC 200 may include a first portion 210 that is to be controlled using thermometer bits and a second portion 220 that is to be controlled using binary weighted bits. As shown in FIG. 4, first portion 210 may include legs having equal resistances (i.e., a value of 4 RΩ). The legs of first portion 210 may be separated from the legs of second portion 220 by a resistance (i.e., 3 RΩ). As further shown in FIG. 4, second portion 220 may include legs having equal resistances (i.e., 2 RΩ) and having a series resistance (i.e., R) coupled between the parallel legs. Accordingly, second portion 220 has an R2R structure. In operation, control bits are provided to a plurality of switches 230 (only one of which is identified with reference numeral 230 in FIG. 4). While the switches may take different forms, in some embodiments the switches may be transistors, such as metal-oxide-semiconductor field-effect transistors (MOSFETS). Switches 230 are used to couple a given leg of the resistor ladder between a ground potential (i.e., open) and a closed position (i.e., connected to a virtual ground 240) and is thus connected into the circuit to provide an output. Based on the value of the various thermometer bits and binary bits provided to control switches 230, and the reference voltage ($V_{REF}$) provided to DAC 200, an analog value is generated having a current ($I_{out}$) that is converted to a voltage ($V_{out}$) via a resistor ($R_{out}$).

By using a resistor ladder for DAC 200 instead of a transistor-based DAC, noise may be minimized, as resistors have minimal noise compared to transistors and are not as signal-dependent. Furthermore, any noise, particularly flicker noise, inherent in switches 230, which may be MOSFETS or other transistors, is minimized according to the size of the transistors with respect to the resistance of the legs of the resistor ladder.

The control signals used to control second DACs 120 and third DACs 130 may be generated in a variety of manners. For example, in some embodiments the control signals may be generated in a digital signal processor (DSP) within a SLIC. However, it is to be understood that these control signals may be generated in other manners also. Furthermore, the control signal may be based upon user-selected values for different parameters of the meter pulses, such as amplitude, ramp rate, and the like.

Figure 5:
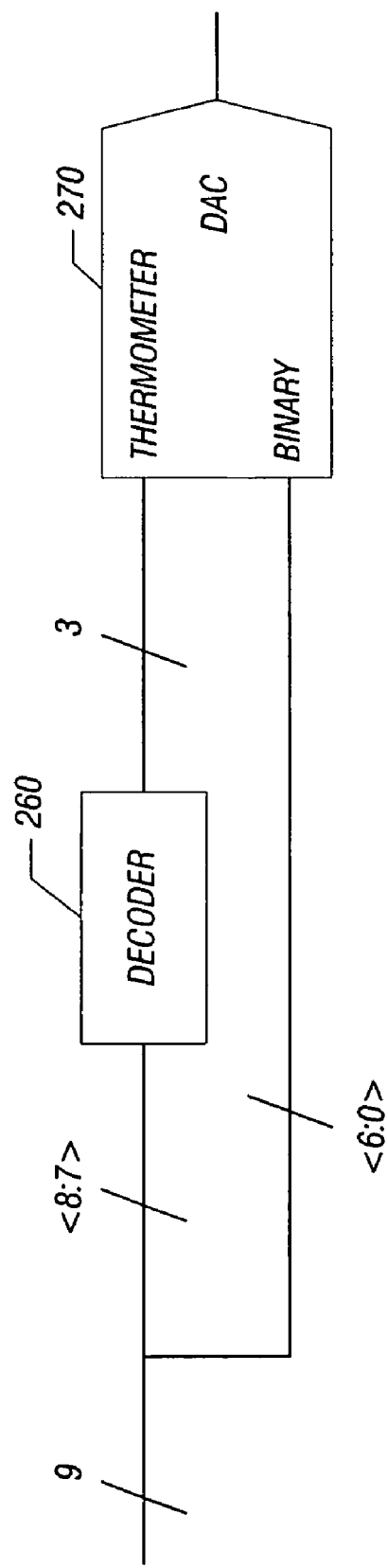
FIG. 5 is a block diagram of a portion of a control path for a digital-to-analog converter circuit in accordance with one embodiment of the present invention

In various embodiments, the control signals may be digitally provided to the DACs. As an example, control signals may take the form of a multi-bit word. In some embodiments, the multi-bit word may be provided to a controller coupled to the DACs to enable decoding of the word to provide the specific control signals to given elements of the DAC. For example, referring to FIG. 5, shown is a block diagram of a portion of a control path for a DAC in accordance with one embodiment of the present invention. More specifically, FIG. 5 shows a control path for a ramp DAC 270. In the embodiment of FIG. 5, ramp DAC 270 may include certain bits that are controlled using thermometer bits and certain bits that are controlled using binary weighted values. As an example, DAC 270 may include three thermometer controlled legs corresponding to the most significant bits (MSBs) of a ramp control word (e.g., bits 8:7 in the embodiment of FIG. 5) and seven binary-weighted legs controlled by the least significant bits (LSBs) of the ramp control word (e.g., bits 6:0 in the embodiment of FIG. 5). As further shown in FIG. 5, the MSBs of the incoming ramp control word may be provided to a decoder 260 that decodes the bits to generate a decoded value that is provided to the thermometer-controlled legs of DAC 270. While shown with this configuration in FIG. 5, it is to be understood that ramp DACs (and other DACs) in accordance with an embodiment of the present invention may be configured differently.

In some embodiments, the noise inherent in switches used to select legs of resistor-based DACs (e.g., switches 230 of FIG. 4) may be reduced, at least in the audio band of interest. More specifically, such switches may be controlled with a control scheme to effectively "chop" flicker noise of the switches by modulating such noise to a higher frequency. Chopping occurs when devices are multiplexed between differential outputs having a 50% duty cycle for each of the differential outputs (i.e., a 50/50 duty cycle), effectively canceling differentially low frequency noise components. Accordingly, thermometer bits used to control, for example, first portion 210 of DAC 200 in FIG. 4 may be controlled with a first-on, first-off (FOFO) control scheme.

Figure 6A:
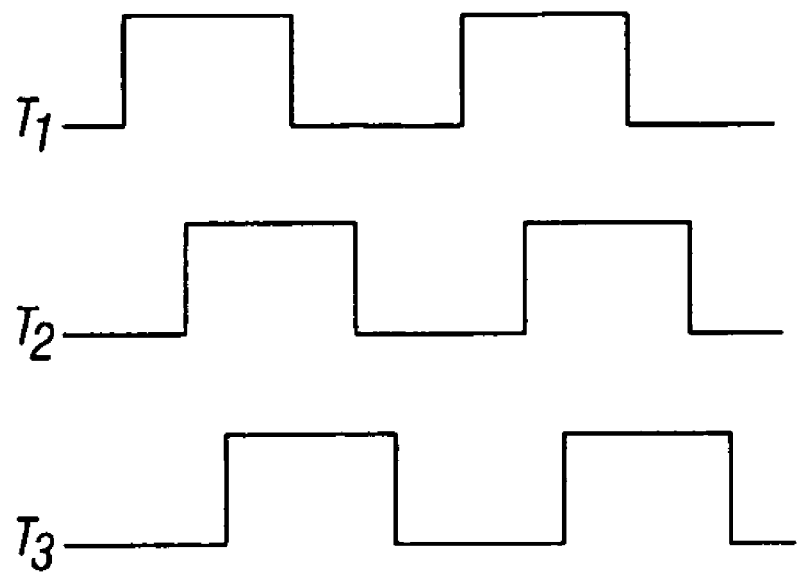
FIG. 6A is a timing diagram of a control scheme in accordance with one embodiment of the present invention.
Figure 6B:
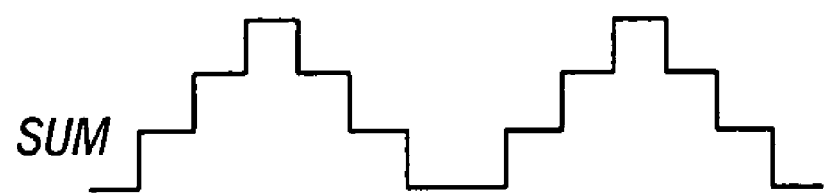
FIG. 6B is a digitally represented sine wave formed in accordance with one embodiment of the present invention.

Referring now to FIG. 6A, shown is a timing diagram of such a FOFO control scheme in accordance with one embodiment of the present invention. Shown in FIG. 6A are timing diagrams for three control signals which may correspond to thermometer bits (i.e., T1, T2 and T3) that are used to control three legs of a resistor ladder. As shown in FIG. 6A, the control signals implement a FOFO scheme, whereby first control signal T1 is the first control signal turned on, followed by control signal T2, followed by control signal T3. Then, control signal T1 is the first to turn off, followed by control signal T2, followed by control signal T3. Summing these control signals together leads to the sum signal shown in FIG. 6B, which is a digitally represented sine wave formed from the sum of legs of a DAC controlled by control signals T1, T2 and T3. Note that FIGS. 6A and 6B are not drawn to scale, either in time or amplitude. In some embodiments, a global sine wave DAC and a ramp DAC may be controlled according to a FOFO control scheme, although other implementations are possible.

To reduce power consumption of a SLIC in accordance with an embodiment of the present invention, the third level of cascaded DACs (e.g., third DACs 130*a-d* in FIG. 2) can be segmented into two smaller DACs. By use of multiple smaller DACs, power consumption may be reduced when a low gain setting is selected. That is, if a lower gain setting is selected, one of the smaller DACs may be shut down to reduce power dissipation. In other embodiments, more than two such DACs may be provided to allow for further power reductions.

Figure 7A:
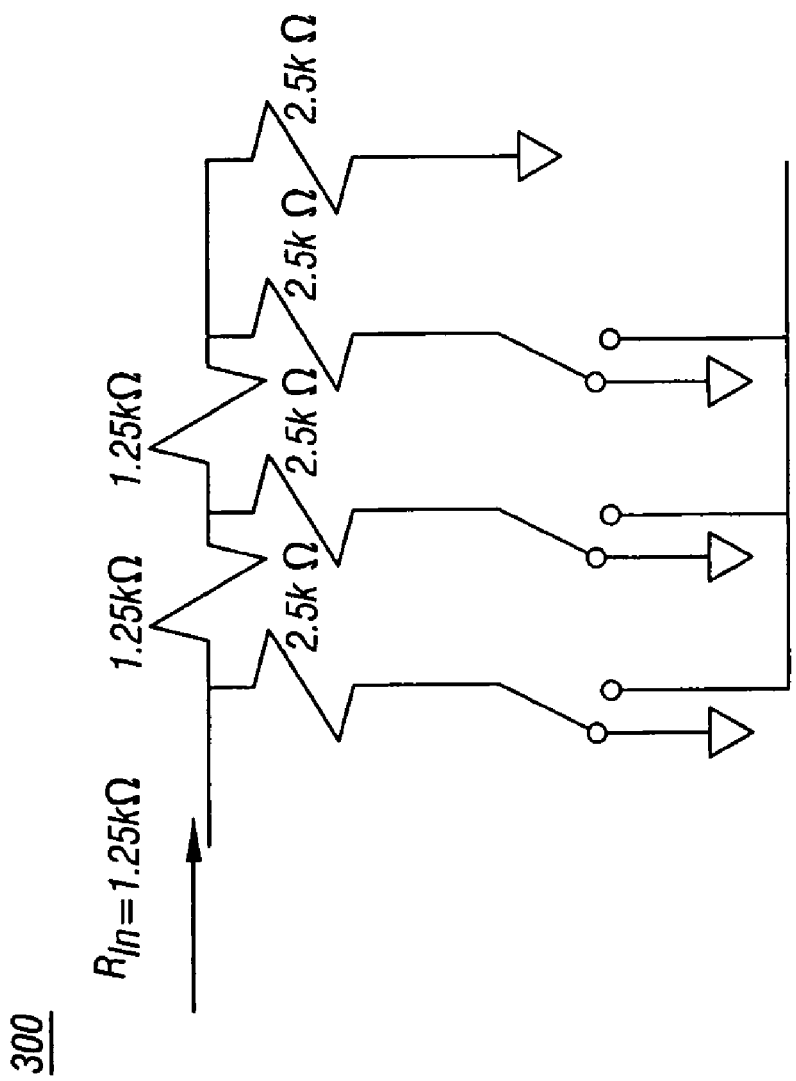
FIG. 7A is a block diagram of an example third digital-to-analog converter circuit in accordance with one embodiment of the present invention.

Referring now to FIG. 7A, shown is an example third DAC 300. While shown as being a three-bit DAC for purposes of discussion, it is to be understood that the scope of the present invention is not so limited. As shown in FIG. 7A, third DAC 300 is formed with a R2R structure, with each parallel leg having a 5 kΩ resistance value, and wherein the legs are coupled using 2.5 kΩ series resistors.

Figure 7B:
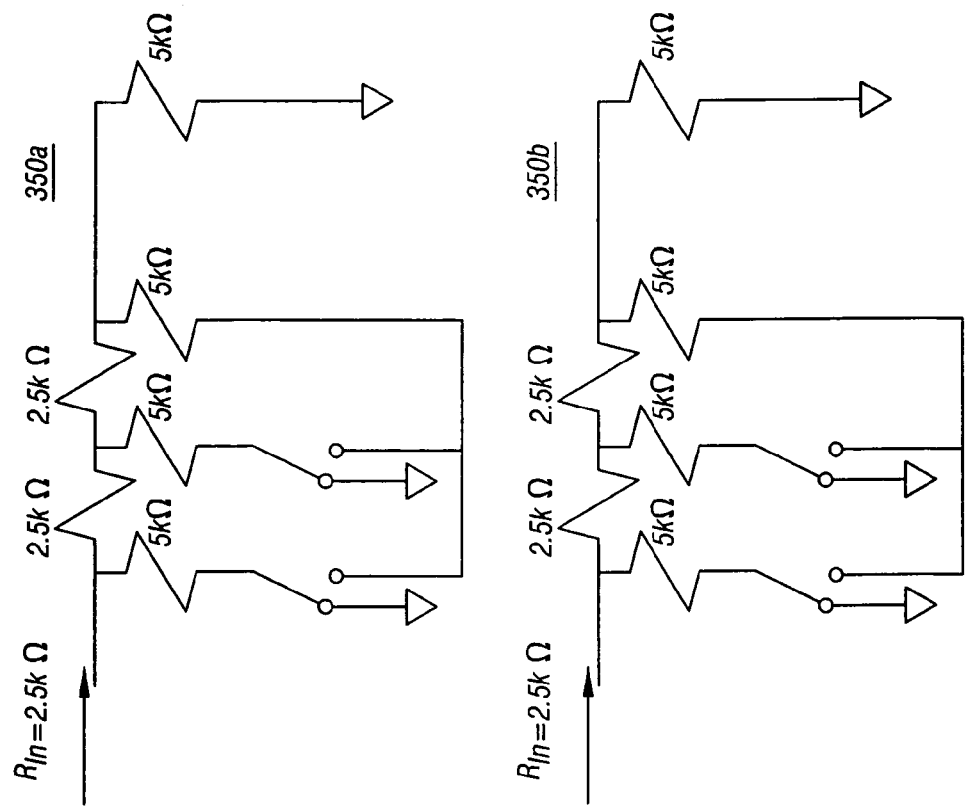
FIG. 7B is a block diagram of multiple digital-to-analog converter circuits in accordance with one embodiment of the present invention.

The single DAC of FIG. 7A may instead be implemented using two smaller DACs, such as shown in FIG. 7B. Shown in FIG. 7B are two smaller sized DACs 350*a* and 350*b*, also formed using an R2R structure. As shown in FIG. 7B the resistance values in third DACs 350*a* and 350*b* are twice that of third DAC 300 of FIG. 7A. Note that the resistance values shown in FIGS. 7A and 7B are exemplary, and other values can be used in other embodiments.

In operation, when the gain value used to control third DACs 350 is below a preselected threshold, only a single one of the DACs needs to be powered up, thus reducing power dissipation. For example, in one embodiment when a gain setting below 50% of the maximum gain setting is selected, only the first one of the smaller DACs, DAC 350*a*, is powered on, thus reducing power consumption. As described above, because the gain setting is based on the line impedance of a subscriber line to which a SLIC is coupled, a low gain setting for a given environment can allow the third DAC 350*b* to remain powered down while coupled to the subscriber line, reducing the SLIC's power consumption. Note that once a SLIC is coupled to a subscriber line, the gain setting generally does not change.

Figure 8:
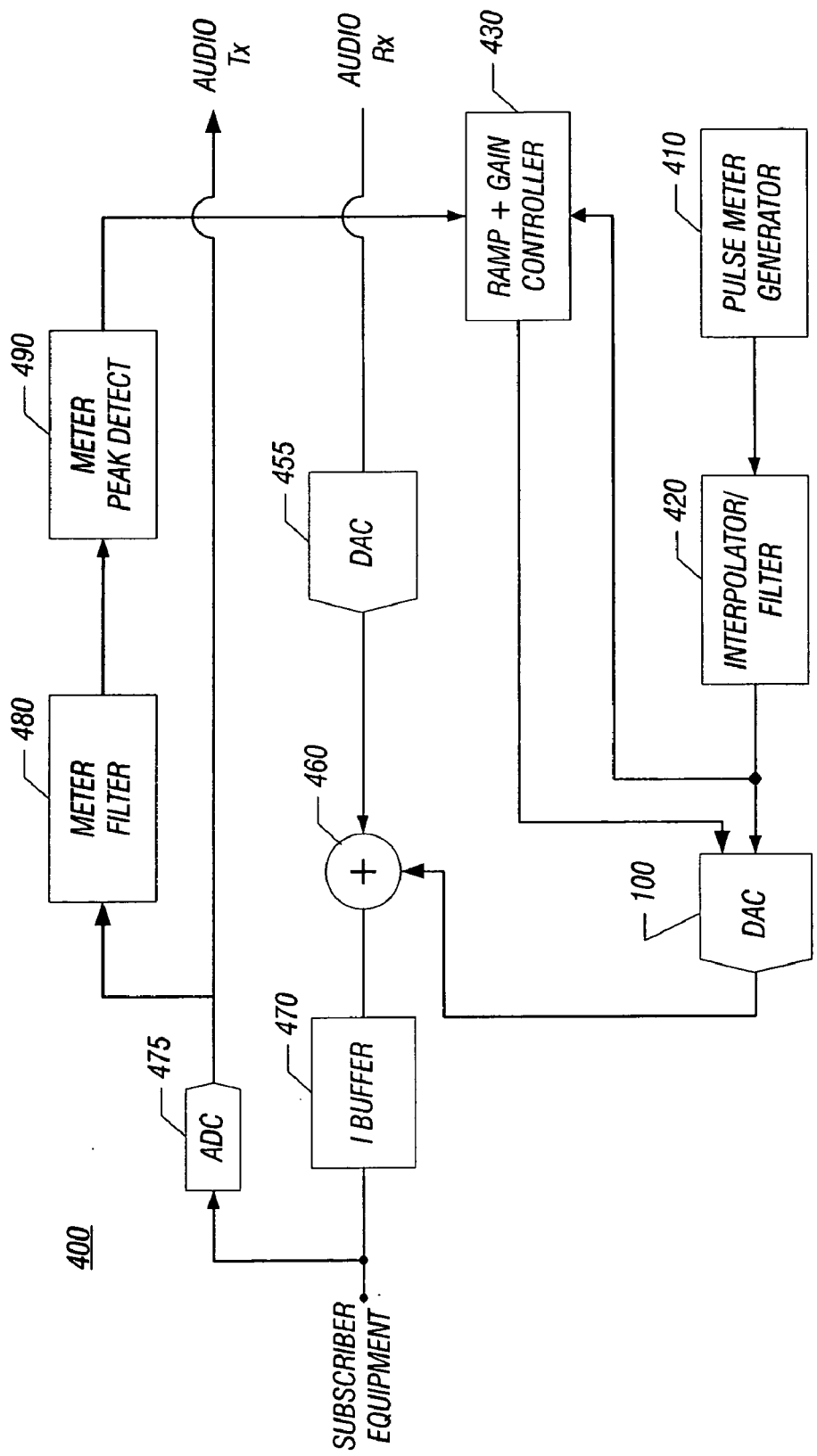
FIG. 8 is a block diagram of a portion of a subscriber line interface circuit in accordance with one embodiment of the present invention.

Referring now to FIG. 8, shown is a block diagram of a portion of a SLIC in accordance with one embodiment of the present invention. More specifically, SLIC 400 shown in FIG. 8 includes a pulse metering path for the generation of metering pulses, in addition to a feedback loop for the pulse metering path. Furthermore, FIG. 8 shows the relative location of incoming and outgoing audio paths of SLIC 400. Specifically, FIG. 8 shows an outgoing audio path (i.e., out to a subscriber equipment), shown in FIG. 8 as the Audio Rx path which includes a DAC 455 and an incoming audio path (i.e., into the SLIC from the subscriber equipment), labeled in FIG. 8 as Audio TX. The incoming audio path includes an analog-to-digital converter (ADC) 475. While shown in FIG. 8 as including only a DAC and an ADC for simplicity, it is to be understood that the audio paths may include various components to process the audio signals, both incoming and outgoing. Similarly, additional circuitry may be present in a SLIC that is not shown in FIG. 8.

The pulse metering path includes a pulse meter generator 410, which may be a digital oscillator. In some embodiments, pulse meter generator 410 may be implemented in a DSP, although the scope of the present invention is not so limited. Pulse meter generator 410 may generate a digital sine wave with reduced noise. In one embodiment, pulse meter generator 410 may include a memory to store preselected sample points from which to digitally generate a sine wave. For example, a read only memory (ROM) may be pre-loaded with sample data corresponding to a desired pulse meter frequency. As one example, four data points may be stored for generating a 16 kHz metering pulse. In this example, the four data points may be sampled at a 64 kHz rate to generate the digital sine wave. In an implementation for generating a 12 kHz metering pulse, data points for multiple sine wave periods may instead be stored. As an example, 16 data points for 3 cycles of a sine wave may be stored. Accordingly, the stored data values may be sampled also as 64 kHz to generate the desired frequency digital sine wave. However, in either event there is a potential error in that the generated sine wave does not reach its peak amplitude due to the limited samples. One method of compensating for this potential error is discussed below.

The outgoing digital sine wave is coupled to an interpolator/filter stage 420 that may include a plurality of interpolators in addition to a low pass filter. Interpolator/filter stage 420 may provide smoothing functions to the digital sine wave, reducing image signal. In various embodiments, stage 420 may be implemented in a DSP. In one embodiment, interpolator/filter stage 420 may include a first interpolator, a low pass filter, and a second interpolator. These components, which may be routines in the DSP, may be used to reduce image signal. That is, the digital sine wave generated will create images at different harmonics. As one example, images at 64 kHz plus and minus the metering pulse (e.g., at 52 kHz and 76 kHz for a 12 kHz metering pulse) may be generated. To combat such images, the first interpolator may (for example) place a zero at 64 kHz to reduce aliasing by these images. Next, a low pass filter may block signals greater than the target frequencies of the metering pulses to higher frequencies. Then a second interpolator may remove further images, for example, at 128 kHz by interpolating the digital sine wave to a significantly greater frequency, for example, 8.192 MHz. These interpolated images may later be removed, as will be discussed further below.

The output of interpolator/filter stage 420 is coupled to a DAC 100. In various embodiments, DAC 100 may include a plurality of DAC stages. In the embodiment of FIG. 8, DAC 100 may correspond to DAC 100 of FIG. 2. The resolution of the individual DACs forming DAC 100 may be less, and in some embodiments, substantially less than the resolution of audio path DAC 455. The output of interpolator/filter stage 420 is also coupled to part of a feedback path, and more specifically to a ramp and gain controller/crossing detector circuit 430 (hereafter referred to as "ramp controller 430"). As will be discussed further below, ramp controller 430 may determine zero crossings of the digital sine wave from the feedback obtained from interpolator/filter stage 420 for use in controlling a ramp DAC.

Ramp controller 430 may be implemented at least in part in a DSP, and may be used to provide control signals to DAC 100. Ramp controller 430 may further include automatic gain control (AGC) circuitry to perform gain control for DAC 100. More specifically, ramp controller 430 may provide digital control signals for the ramp DACs and gain DACs within DAC 100. Furthermore, ramp controller 430 may include a crossing detector to detect zero crossings of generated metering pulses, obtained from interpolator/filter 420. In turn, digital outputs of ramp controller 430 may be provided to DAC 100. Preferably, any changes to control signals for the ramp DACs may occur when a zero is detected in the meter pulse, thus reducing noise. In such manner, noise generated in pulse metering generation that may affect higher frequency data, such as DSL data may be reduced.

Still referring to FIG. 8, the output of DAC 100, which may be the scaled metering pulses, is provided to a summing node 460, where it may be combined with the audio path. The resulting signals are buffered using a current buffer 470 and are coupled to the subscriber equipment. Current buffer 470 may further include filtering components, such as a low pass filter (LPF) which may be used to remove high frequency images before transmission of the metering pulses to the audio output line. For example, the LPF of current buffer 470 may pass the metering pulses, while removing images generated during interpolation (such as the interpolated images at 8.192 MHz). Furthermore, by reducing images and other energy out of the metering pulse frequency, interference with audio communication as well as data communication, e.g., via DSL transmission or otherwise is also reduced.

As further shown in FIG. 8, a feedback path may be formed using the audio transmit path. Using echoes of the metering pulses present in the incoming audio path, attributes of the metering pulses may be controlled using a feedback loop. More specifically, as shown in FIG. 8, a meter filter 480, which may be a bandpass filter, is coupled to extract reflected energy in the bandwidth of the metering pulses (e.g., 12 kHz or 16 kHz) from the audio path. As shown in FIG. 8, meter filter 480 may be coupled to receive digital signals from ADC 475. Furthermore, while not shown for ease of illustration in FIG. 8, it is to be understood that certain signal processing may be performed on incoming audio signals prior to conversion by ADC 475. For example, various filtering and anti-aliasing operations may be performed on incoming audio data before being passed to ADC 475.

Meter filter 480 may be a bandpass filter to pass signals of a desired frequency, and specifically a frequency range including the metering pulses. Furthermore, filter 480 may remove unwanted information at other frequencies, for example, DSL data included with the incoming audio signals. In some embodiments, meter filter 480 may be programmable under user control to select a bandwidth for the bandpass filter consistent with the frequency selected for the generation of the metering pulses.

Filtered signals are then provided to a meter peak detector 490 which is used to detect the peak amplitude of the metering pulses and provide the value for use in ramp controller 430. In some embodiments, where the feedback path is sampled at a limited rate, compensation may be effected near the threshold values to enable accurate measures of the amplitude. For example, because only a limited number of data samples are provided to generate the digital sine wave (e.g., four samples for a 16 kHz rate) it is possible that the generated sine wave never reaches its maximum amplitude. In various embodiments, a potential error rate or difference between the actual amplitude and the digital sine wave maximum amplitude may be between approximately 0% and 8%. Accordingly, such compensation may account for this possible error. The peak threshold value used in detector 490 may correspond to a determined threshold that compensates for potential errors in the amplitude of the generated sine wave, as will be discussed below.

In various embodiments, the digital sine wave generated by pulse meter generator 410 may be generated using a lookup table stored in a read only memory (e.g., associated with a DSP). The digitally generated sine wave may thus guarantee purity by not allowing drift between different periods.

As previously shown in FIG. 2, DAC 100 includes a cascaded DAC architecture having a global sine wave DAC (i.e., first DAC 110). The output of the global DAC is multiplied by a channel-specific ramp value and a ramp DAC (i.e., second DACs 120) and, the value of which is then multiplied by a gain setting in a gain DAC (i.e., third DACs 130). In various embodiments, the gain setting may be selected to maximize the ramp value in order to minimize audible harmonics. That is, the gain value may be set so that the ramp value provided to the ramp DACs is at a maximum value. In other words, the ramp DACs may be maximized by determining an appropriate gain value to control the ramp DACs to approximately their maximum value (with a small amount of headroom) in some embodiments. To further avoid noise, the ramp values to control the ramp DACs may change values only when the global sine wave DAC is at a zero volt crossing, e.g., as determined by ramp controller 430.

When a SLIC is reset (or at other desired times), a calibration process may occur. In one embodiment, the calibration may be a gain calibration in which a maximum value for the gain setting is selected on the first pulse in order to determine the appropriate subsequent setting for the gain value that will maximize the ramp value. Thus, the first metering pulse generated after a reset may be applied using a maximum gain setting to calibrate the circuit against an (unknown) line impedance. Furthermore, a slowest non-audible ramp rate may be used to minimize a voltage overshoot caused by the maximum gain setting. Accordingly, feedback from this first pulse may be used to determine line characteristics (e.g., line impedance). After the first pulse, the gain setting may be dynamically adjusted after every pulse to account for changes in the line impedance.

In some embodiments if the ramp DAC does not increment into its desired range before the peak is detected, the gain value may be adjusted downwards on the next pulse. However, if the ramp DAC increments to its terminal value before the peak is detected, a calibration may occur on the next pulse. In some embodiments, a calibration may be enabled every time that pulse metering is enabled.

In some embodiments, user-selectable values may be set in a control register to control various functions of pulse metering. Referring now to Table 1, shown is an example pulse metering control register in accordance with one embodiment of the present invention.

TABLE 1

| Bit 7 | Bit 6 | Bit 5 | Bit 4 | Bit 3 | Bit 2 | Bit 1 | Bit 0 |
|---|---|---|---|---|---|---|---|
| Power Save | Unused | Ramp Rate | | Regain | Ramp Up | Frequency Select | Enable |

Thus as shown in Table 1, a pulse metering control register may include a plurality of bits, each defined to handle different functions associated with pulse metering. In the control register of Table 1, the following bit definitions may be used, although it is to be understood the scope of the present invention is not so limited.

| Bit Definitions | | |
|---|---|---|
| Bit [0] | 0: | Disables pulse metering for a selected channel. |
| | 1: | Enables pulse metering for a selected channel. |

| -continued | | |
|---|---|---|
| Bit Definitions | | |
| Bit [1] | 0: | Selects a 12 kHz pulse metering frequency. |
| | 1: | Selects a 16 kHz pulse metering frequency. |
| Bit [2]: | 0: | Initiates ramp down (i.e., corresponding to point C in FIG. 3). |
| | 1: | Initiates ramp up (i.e., corresponding to point A in FIG. 3). |
| Bit [3]: | 0: | Gain calibration to occur on the first pulse out of reset only. |
| | 1: | Gain calibration to occur on the first pulse every time pulse metering is enabled. |
| Bit [5:4] | 00: | 24 kHz ramp (12 kHz)/32 kHz ramp (16 kHz) |
| | 01: | 12 kHz ramp (12 kHz)/16 kHz ramp (16 kHz) |
| | 10: | 6 kHz ramp (12 kHz)/8 kHz ramp (16 kHz) |
| | 11: | 3 kHz ramp (12 kHz)/4 kHz ramp (16 kHz) |
| Bit [7] | 0: | Normal operation. |
| | 1: | Additional power saving mode. |

During gain calibration, bits [5:4] may be set equal to 10 in order to minimize the error introduced by using the maximum gain value. Because a ramp value of 3 kHz or 4 kHz (shown in Table 1 as corresponding to bits [5:4] equal to 11) is in an audio band, its selection may be avoided during normal operation of a SLIC. Instead, this value may be used for testing purposes, in some embodiments.

As to the power management, the normal operation is to power down the channel DACs (i.e., ramp and gain) when pulse metering for that channel is inactive, and to power down the global sine DAC when pulse metering is inactive for all channels. The power saving mode, when enabled (i.e., via bit [7]), will power down the channel DACs when not ramping, and the global DAC when all channel DACs are powered down. This bit may be user protected, in some embodiments.

In various embodiments, the threshold value used by peak detector 490 may be user controlled. In operation, when the threshold value is detected in block 490, the ramping will end, and the metering pulse will remain at a constant amplitude until the ramp down signal is selected, causing the metering pulse to ramp down. In one embodiment, the pulse metering threshold may be calculated using the following equation:

$$\text{Pulse metering threshold} = \text{int}((K \times \text{level})/\text{peak}) \quad \text{[Eq. 2]}$$

where K=13,873 for a selected 12 kHz pulse frequency, and 13,083 for a selected 16 kHz pulse frequency. This number incorporates the attenuation and error compensation. It also performs the proper shifting to obtain the integer value. In Eq. 2, level equals the metering voltage level seen at the subscriber line interface and peak equals the ADC peak voltage, i.e., of ADC 475.

Figure 9:
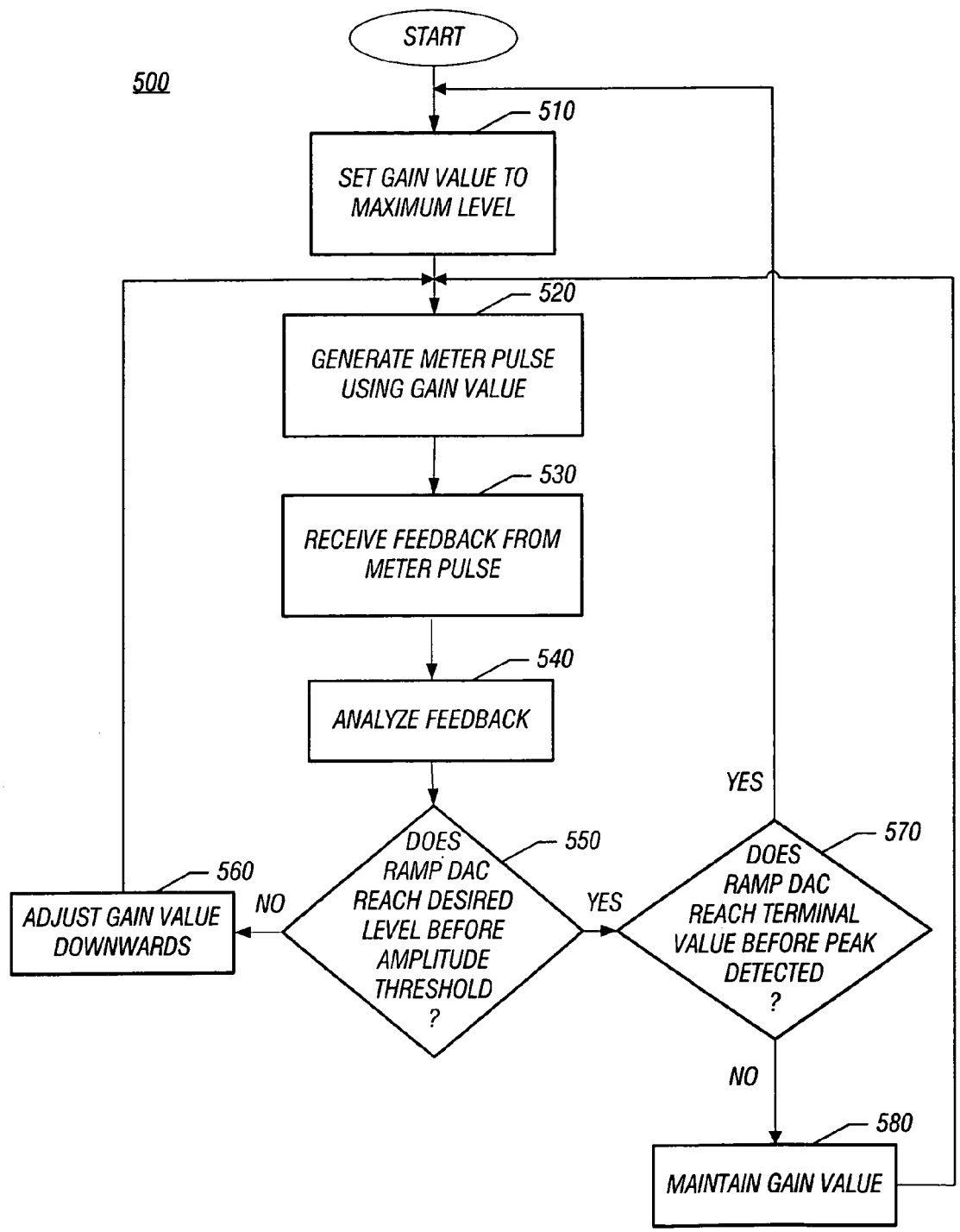
FIG. 9 is a flow diagram of a method in accordance with one embodiment of the present invention.

Referring now to FIG. 9, shown is a flow diagram of a calibration method in accordance with one embodiment of the present invention. As shown in FIG. 9, method 500 may be used to calibrate metering pulses generated by a SLIC. More specifically, method 500 may perform gain calibration in an effort to set a level for the DACs to reduce noise. Method 500 may begin by setting a gain value to a maximum level (block 510). That is, a gain value provided to one or more gain DACs can be set to a maximum level. While this level may vary, in some embodiments, the maximum level may correspond to a value of all logic one's. Using this maximum gain setting, along with other predetermined initial values for a ramp value and a reference voltage for a global sine wave DAC, a metering pulse may be generated (block 520). In one embodiment, the predetermined initial ramp value may be set to a lowest value outside of an audio band. For example, in one embodiment, a ramp setting of 6 kHz or 8 kHz (e.g., for a 12 kHz or a 16 kHz metering pulse, respectively) may be selected.

The metering pulse is thus fed into the audio path for insertion onto a subscriber line. To control the metering pulses to achieve desired amplitude and to reduce noise, feedback may be obtained from the metering pulses (block 530). As an example, the feedback may be extracted from echoes of the metering pulses occurring on an incoming audio path of the SLIC. Next, the feedback may be analyzed (block 540). For example, the amplitude of the feedback signal and its zero crossings may be determined.

Based on this feedback, it may be determined whether the ramp DAC reaches its desired level before the amplitude threshold (i.e., the peak value) is reached (diamond 550). In various embodiments, this desired level may correspond to a substantially maximum value for the ramp DAC, with a small amount of margin or headroom. If the ramp DAC does not reach its desired level, the gain value used to control the gain DAC may be adjusted downwards (block 560). Then control may return to block 520.

If instead at diamond 550 it is determined that the ramp DAC reaches its desired level, next it may be determined whether the ramp DAC reaches its terminal value before the peak is detected (diamond 570). If it does, calibration may be reinitiated, with control returning to block 510. If instead the peak value is detected before the ramp DAC reaches its terminal value, the gain value may be maintained (block 580), and control returns to block 520 for further feedback monitoring.

Embodiments may be implemented in a computer program that may be stored on a storage medium having stored thereon instructions which can be used to program a system to perform the embodiments. The storage medium may include, but is not limited to, any type of electronic storage medium, or any other type of media suitable for storing electronic instructions. Similarly, embodiments may be implemented as software modules executed by a programmable control device, such as a DSP or the like.

In some applications a SLIC in accordance with an embodiment of the present invention may be used in a central telephone exchange that communicates with subscriber equipment using the POTS ("plain old telephone system") interface. Other SLIC applications include private exchanges and "zero loop" applications. Zero loop applications often have a relatively short distance subscriber loop between the subscriber equipment and the SLIC. This is often the case when subscriber equipment interfaces with a non-POTS systems such as a network that uses different communication media or protocols.

Figure 10:
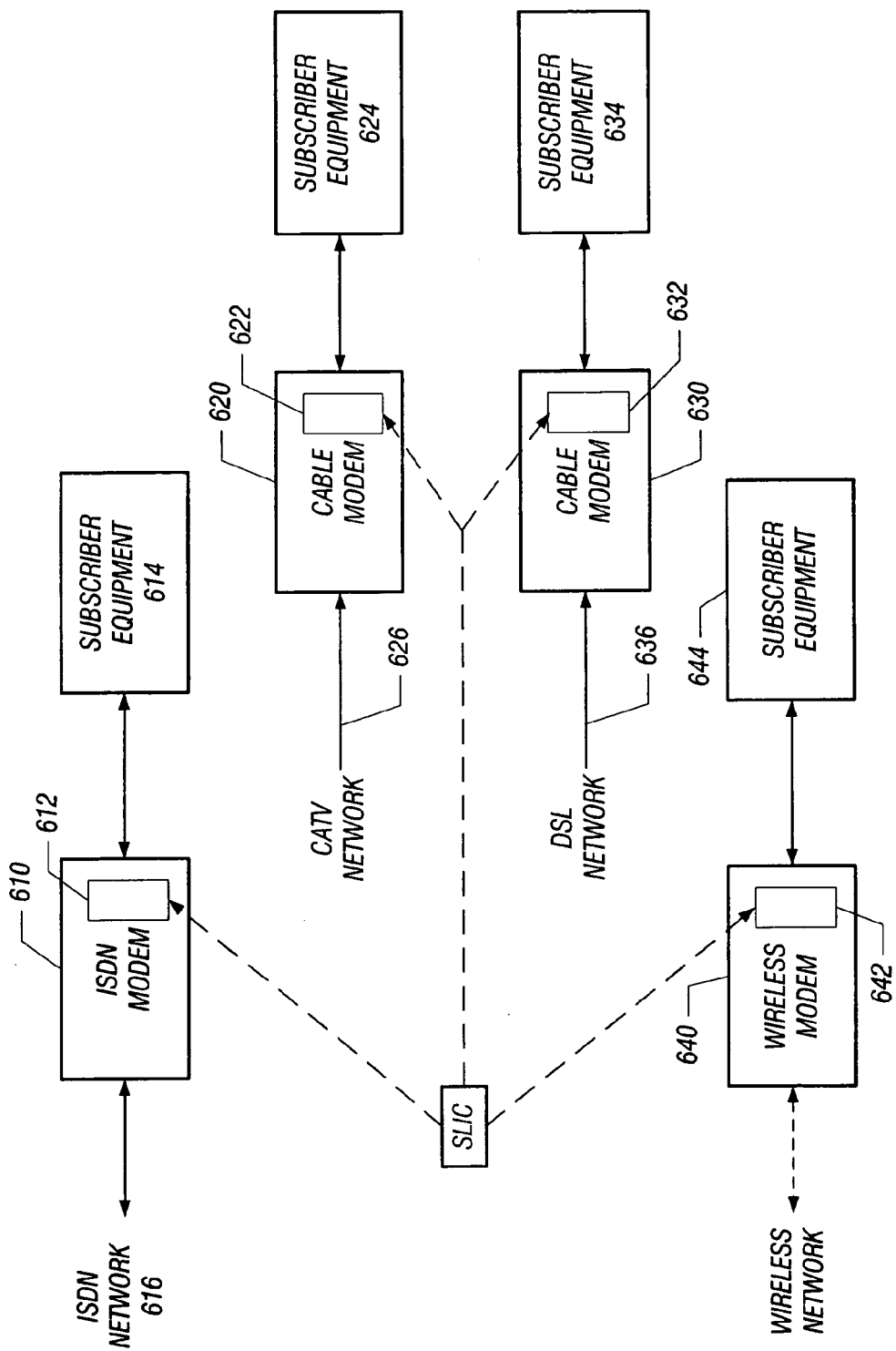
FIG. 10 illustrates different applications of a SLIC in accordance with an embodiment of the present invention.

Referring now to FIG. 10, shown are illustrations of various zero loop applications for the SLIC. In one embodiment, a SLIC 612 is used in an Integrated Services Digital Network (ISDN) modem 610. ISDN modem 610 provides bi-directional communication between subscriber equipment 614 and the ISDN network 616. In another embodiment, SLIC 622 is used in cable modem 620. In one embodiment, cable modem 620 communicates information using the community antenna television (CATV) network 616. SLIC 622 may enable cable modem 620 to communicate information from the coaxial CATV cable 626 to subscriber equipment 624. In another example, digital subscriber line (DSL) modem 630 incorporates a SLIC 632 for communication between digital subscriber line 636 and subscriber equipment 634 having a POTS interface. Another example includes wireless applications such as wireless modem 640 including a SLIC 642 that in turn is coupled between a wireless network and subscriber equipment 644. Of course, other applications are possible. Unlike the central exchange applications, the zero loop applications may enable the design of SLICs having relaxed performance characteristics. In particular, a zero loop application SLIC need not necessarily meet typical POTS standards if the subscriber equipment is not actually connected to the public telephone network.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first digital-to-analog converter (DAC) to convert a digital sine wave into an analog representation; and
a second DAC to multiply the analog representation with a ramp value to obtain a metering pulse.

2. The apparatus of claim 1, further comprising a third DAC to multiply the metering pulse with a gain value to generate a scaled metering pulse.

3. The apparatus of claim 1, wherein the functions performed by the first DAC and the second DAC are orthogonal and exclusive.

4. The apparatus of claim 2, wherein the apparatus comprises a subscriber line interface circuit (SLIC) to couple to a subscriber line.

5. The apparatus of claim 4, wherein the gain value is programmable according to a line impedance of the subscriber line.

6. The apparatus of claim 4, wherein the metering pulse includes tonal noise outside of an audio band of the SLIC.

7. The apparatus of claim 1, wherein a differential non-linearity (DNL) of the first DAC is sufficient to generate the analog representation and is independent of the second DAC.

8. The apparatus of claim 2, wherein the first DAC, the second DAC, and the third DAC are cascaded together to form a cascaded DAC circuit.

9. The apparatus of claim 8, wherein the apparatus comprises a subscriber line interface circuit (SLIC) having an audio path and a pulse metering path, the cascaded DAC circuit being within the pulse metering path.

10. The apparatus of claim 9, wherein the audio path includes at least one DAC having a greater resolution than a resolution of any of the first DAC, the second DAC and the third DAC.

11. The apparatus of claim 1, wherein the second DAC comprises a resistor ladder having a first portion controlled by thermometer values and a second portion controlled by binary weighted values, wherein the thermometer values are controllable by a first-on first-off scheme.

12. The apparatus of claim 2, wherein the third DAC comprises a first smaller DAC and a second smaller DAC.

13. The apparatus of claim 12, wherein the second smaller DAC is controlled to be disabled if the gain value is less than half of its maximum value.

14. A method comprising:
obtaining a periodic wave; and
generating a metering pulse for a subscriber line from the periodic wave, wherein the metering pulse includes tonal noise outside an audible bandwidth of an audio signal on a subscriber line.

15. The method of claim 14, wherein generating the metering pulse comprises:
receiving digital values representing a sine wave at a first digital-to-analog converter (DAC) and generating a first analog output using the fast DAC;
providing the first analog output to a second DAC with a ramp control value; and
generating the metering pulse using the second DAC based on the first analog output and the ramp control value.

16. The method of claim 15, further comprising providing the metering pulse to a third DAC with a gain control value, and generating a scaled metering pulse based on the metering pulse and the gain control value.

17. The method of claim 16, further comprising calibrating the gain control value based on an impedance of the subscriber line.

18. The method of claim 17, wherein calibrating the gain control value comprises:
first setting the gain control value to a maximum value;
receiving a feedback signal indicative of an amplitude of the scaled metering pulse; and
resetting the gain control value to maximize the ramp control value.

19. The method of claim 16, further comprising controlling the ramp control value at a zero crossing of the first analog output.

20. The method of claim 15, further comprising controlling the second DAC using a first-on-first-off control scheme.

21. The method of claim 16, further comprising controlling the gain control value to avoid a transition of the third DAC having an unguaranteed differential non-linearity.

22. The method of claim 16, wherein the third DAC comprises a first smaller DAC and a second smaller DAC, and further comprising disabling the second smaller DAC if the gain control value is less than half of its maximum value.

23. A subscriber line interface circuit (SLIC) comprising:
an audio path to transmit audio signals from the SLIC to a subscriber line; and
a pulse metering path to generate a metering pulse for transmission via the subscriber line, the pulse metering path including a cascaded digital-to-analog converter (DAC) including a first DAC level and a second DAC level to generate the metering pulse.

24. The SLIC of claim 23, wherein the cascaded DAC comprises a global DAC to generate a sine wave, a first channel ramp DAC to generate an unscaled metering pulse using the sine wave, and a first channel gain DAC to generate the metering pulse using the unsealed metering pulse.

25. The SLJC of claim 24, wherein an equivalent resolution of the cascaded DAC corresponds to a substantially higher resolution than a resolution of any of the global DAC, the first channel ramp DAC, and the first channel gain DAC.

* * * * *

UNITED STATES PATENT AND TRADEMARK OFFICE
CERTIFICATE OF CORRECTION

PATENT NO. : 7,280,062 B2
APPLICATION NO. : 11/240206
DATED : October 9, 2007
INVENTOR(S) : Michael Mills et al.

Page 1 of 1

It is certified that error appears in the above-identified patent and that said Letters Patent is hereby corrected as shown below:

Column 15:
Line 5 claim 15, "fast" should be --first--.

Column 16:
Line 23 claim 24, "unsealed" should be --unscaled--.

Signed and Sealed this

Eighteenth Day of March, 2008

JON W. DUDAS
*Director of the United States Patent and Trademark Office*